(12) United States Patent
Chung et al.

(10) Patent No.: US 11,100,309 B2
(45) Date of Patent: Aug. 24, 2021

(54) FINGERPRINT SENSING DEVICE

(71) Applicant: Guangzhou Tyrafos Semiconductor Technologies Co., LTD, Guangzhou (CN)

(72) Inventors: Jun-Wen Chung, Tainan (TW); Hsu-Wen Fu, Kaohsiung (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 16/903,380

(22) Filed: Jun. 17, 2020

(65) Prior Publication Data

US 2021/0049341 A1 Feb. 18, 2021

Related U.S. Application Data

(60) Provisional application No. 62/885,833, filed on Aug. 13, 2019.

(51) Int. Cl.
*G06K 9/00* (2006.01)
(52) U.S. Cl.
CPC ....... *G06K 9/00046* (2013.01); *G06K 9/0004* (2013.01)
(58) Field of Classification Search
None
See application file for complete search history.

(56) References Cited

U.S. PATENT DOCUMENTS

| 4,924,085 | A | 5/1990 | Kato et al. | |
|---|---|---|---|---|
| 2014/0043856 | A1* | 2/2014 | Thompson | G02B 6/0035 362/613 |
| 2017/0323144 | A1* | 11/2017 | Wu | G06K 9/00046 |
| 2018/0268194 | A1* | 9/2018 | Lin | G06K 9/0004 |
| 2019/0138154 | A1* | 5/2019 | Smith | B32B 7/02 |

FOREIGN PATENT DOCUMENTS

| TW | M567415 | 9/2018 |
|---|---|---|
| TW | M575562 | 3/2019 |

OTHER PUBLICATIONS

"Office Action of Taiwan Counterpart Application", dated Aug. 20, 2020, p. 1-p. 6.

* cited by examiner

*Primary Examiner* — Joseph R Haley
(74) *Attorney, Agent, or Firm* — JCIPRNET

(57) ABSTRACT

A fingerprint sensing device including a light guide cover plate, a light source, an image sensor, and a light output element is provided. The light guide cover plate includes a flat plate portion and a light entering portion. The flat plate portion has a first surface and a second surface opposite to each other. The light entering portion is located at the second surface, and has an inclined light incident surface inclined with respect to the first surface and the second surface. The light source is configured to emit a light beam. The light beam is transmitted to the light entering portion and the flat plate portion in sequence via the inclined light incident surface. The light output element is disposed on the second surface, and guides the light beam in the flat plate portion to the image sensor.

16 Claims, 6 Drawing Sheets

FINGERPRINT SENSING DEVICE

CROSS-REFERENCE TO RELATED APPLICATION

This application claims the priority benefit of U.S. provisional application Ser. No. 62/885,833, filed on Aug. 13, 2019. The entirety of the above-mentioned patent application is hereby incorporated by reference herein and made a part of this specification.

BACKGROUND OF THE INVENTION

Field of the Invention

The invention relates to a sensing device, and in particular to a fingerprint sensing device.

Description of Related Art

Due to the recent development of portable electronic products in the direction of high screen ratio and full screen, there is no area on the front of a portable electronic device (such as a smart phone and a tablet computer) where a fingerprint sensor may be placed. Therefore, various solutions have been proposed, such as disposing the fingerprint sensor on the back or side of the portable electronic device, or simply abandoning the fingerprint recognition solution and replacing it with other solutions (such as face recognition solutions). The most popular fingerprint recognition solution in recent times is the on-screen fingerprint recognition solution, which is to allow the finger of a user to complete fingerprint recognition by pressing the screen, so that a portable electronic product may maintain a high screen ratio or full screen without compromising the convenience of full fingerprint recognition on the front of the portable electronic product.

To achieve on-screen fingerprint recognition, a solution is to use a transparent display (such as an organic light-emitting diode (OLED) display), and place a camera used to capture fingerprints below the transparent display. This solution may be called under-screen fingerprint recognition. However, under-screen fingerprint recognition is not readily implemented for portable electronic devices that use liquid crystal displays as screens, mainly because the backlight modules of liquid crystal displays less readily transmit light. Therefore, the development of an on-screen fingerprint recognition solution that may be applied to various types of screens is one of the current important issues.

SUMMARY OF THE INVENTION

The invention provides a fingerprint sensing device that may be widely applied to on-screen fingerprint recognition solutions adopting various types of screens.

An embodiment of the invention provides a fingerprint sensing device including a light guide cover plate, a light source, an image sensor, and a light output element. The light guide cover plate includes a flat plate portion and a light entering portion. The flat plate portion has a first surface and a second surface opposite to each other. The light entering portion is located at the second surface, and has an inclined light incident surface inclined with respect to the first surface and the second surface. The light source is configured to emit a light beam. The light beam is transmitted to the light entering portion and the flat plate portion in sequence via the inclined light incident surface. The light output element is disposed on the second surface, and guides the light beam in the flat plate portion to the image sensor. The light beam entering the flat plate portion from the light entering portion is totally reflected at the first surface and the second surface. The first surface is suitable for pressing by a finger of a user, and a fingerprint ridge of the finger is in contact with the first surface and destroys a total reflection phenomenon of the light beam at the first surface.

In the fingerprint sensing device of an embodiment of the invention, the inclined light incident surface is adopted to guide the oblique light beam to the light guide cover plate, such that the light beam is totally reflected in the light guide cover plate multiple times. When the finger is pressed against the light guide cover plate, the fingerprint ridge destroys the total reflection phenomenon of the light beam at the first surface, so that the image generated by the light beam guided to the image sensor by total reflection generates corresponding dark lines, thus forming the fingerprint image. In this way, no matter what type of display panel (including a transparent display panel or an opaque display panel) is disposed below the light guide cover plate, a fingerprint sensing effect may be effectively achieved. Therefore, the fingerprint sensing device of an embodiment of the invention may be widely applied to on-screen fingerprint recognition solutions adopting various types of screens.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
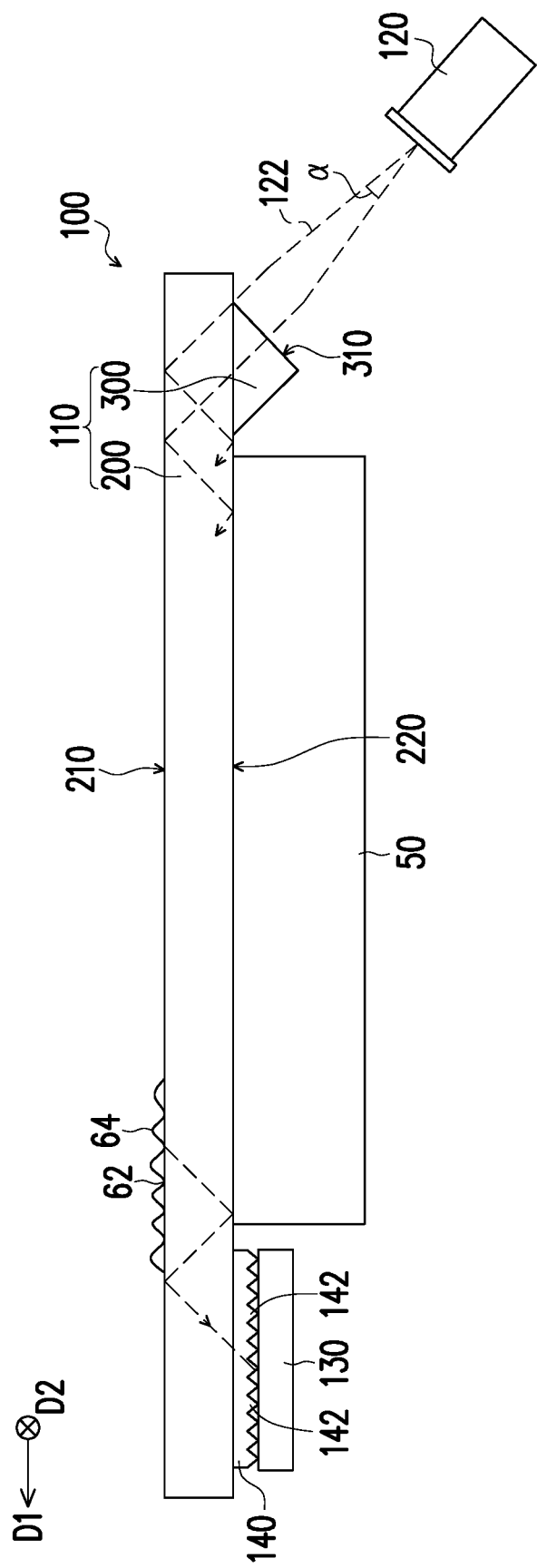
FIG. 1 is a cross-sectional view of a fingerprint sensing device disposed on a display according to an embodiment of the invention.

FIG. 1 is a cross-sectional view of a fingerprint sensing device disposed on a display according to an embodiment of the invention. Referring to FIG. 1, a fingerprint sensing device 100 of the present embodiment includes a light guide cover plate 110, a light source 120, an image sensor 130, and a light output element 140. The light guide cover plate 110 includes a flat plate portion 200 and a light incident portion 300. The flat plate portion 200 has a first surface 210 and a second surface 220 opposite to each other. The flat panel 200 may cover a display 50. The display 50 may be various displays, and may be a transparent display or an opaque display, such as a liquid crystal display or an organic light-emitting diode display, wherein the liquid crystal display may include a backlight module, and a reflective sheet of the backlight module may be a reflective sheet that may not transmit light.

The light incident portion 300 is located at the second surface 220 and has an inclined light incident surface 310, wherein the inclined light incident surface 310 is inclined with respect to the first surface 210 and the second surface 220. The light source 120 is configured to emit a light beam 122. The light beam 122 is transmitted to the light entering portion 300 and the flat plate portion 200 in sequence via the inclined light incident surface 310. In the present embodiment, the light source 120 is, for example, a light-emitting diode (LED), however, in other embodiments, the light source 120 may also be a laser diode or other suitable light sources.

The light output element 140 is disposed on the second surface 220, and guides the light beam 122 in the flat plate portion 200 to the image sensor 130. In the present embodiment, the light incident portion 300 and the light output element 140 are respectively disposed at two opposite ends of the second surface 220. However, in other embodiments, the light incident portion 300 and the light output element 140 may be disposed at other suitable positions on the second surface 220. The light beam 122 entering the flat plate portion 200 from the light entering portion 300 is totally reflected at the first surface 210 and the second surface 220. The first surface 210 is suitable for pressing by a finger of a user, and a fingerprint ridge 62 of the finger is in contact with the first surface 210 and destroys a total reflection phenomenon of the light beam 122 at the first surface 210. In this way, dark lines are formed at a portion in the image formed by the light beam 122 on the image sensor 130 corresponding to the fingerprint ridge 62 so as to form a fingerprint image. In this way, no matter what type of display the display 50 is, and whether the display 50 is transparent or not, on-screen fingerprint sensing may be achieved to satisfy the requirements of the on-screen fingerprint recognition solution.

Figure 2:
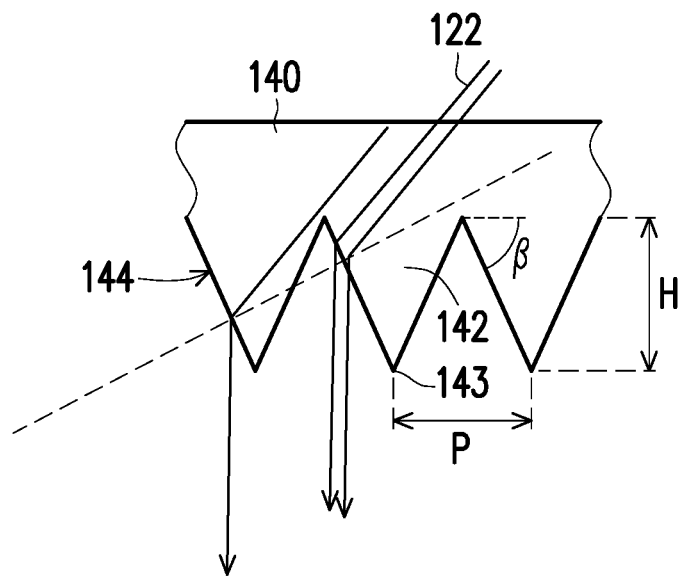
FIG. 2 is a partially enlarged view of the light output element in FIG. 1.

FIG. 2 is a partially enlarged view of the light output element in FIG. 1. Please refer to FIG. 1 and FIG. 2. In the present embodiment, the light output element 140 is a prism sheet, and the prism sheet has a plurality of micro prisms 142. A vertex 143 of the micro prisms 142 faces a direction away from the first surface 210 and the second surface 220. The micro prisms 142 may make the light beam 122 leave the flat plate portion 200 and guide the light beam 122 to the image sensor 130.

Figure 3:
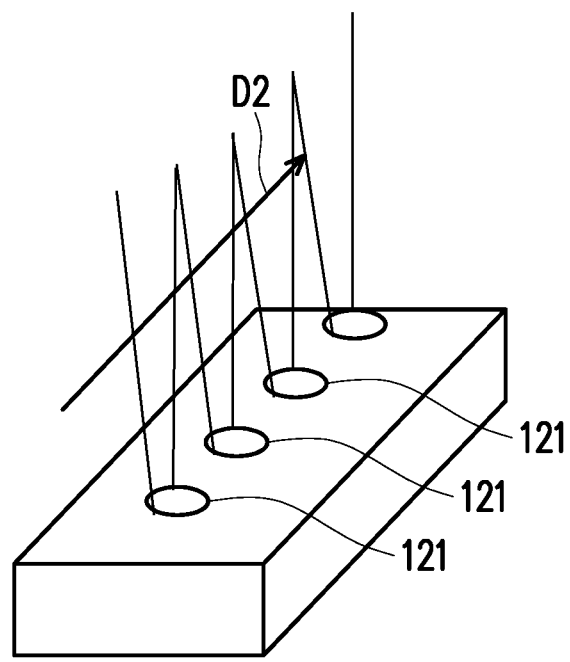
FIG. 3 is a perspective view of a light source in another embodiment.

In the present embodiment, the light output element 140 satisfies: $(45°-\alpha) \leq \beta < 90°$, wherein $\alpha$ is the angle of divergence when the light source 120 emits the light beam 122 (as shown in FIG. 1), and $\beta$ is the angle of inclination of an inclined side surface 144 of the micro prisms 142 with respect to the first surface 210 (as shown in FIG. 2). In the present embodiment, the micro prisms 142 are columnar prisms, and the columnar prisms are arranged along a first direction D1 from the light incident portion 300 toward the light output element 140 and parallel to the second surface 220, and each columnar prism is extended along a second direction D2 perpendicular to the first direction D1 and parallel to the second surface 220. However, in other embodiments, the micro prisms 142 are cone-shaped prisms that may be arranged in a two-dimensional array on a plane formed by the first direction D1 and the second direction D2. In addition, in the above embodiments, a pitch P of the micro prisms 142 falls within the range of 10 nanometers (nm) to 1 micrometer (μm), and a height H (for example, the thickness in a direction perpendicular to the second surface 220) of the micro prisms 142 falls within the range of 10 nanometers to 1 micrometer. In the present embodiment, the cross section of the light beam 122 emitted by the light source 120 is a linear cross section, and the extending direction of the linear cross section is, for example, parallel to the second direction D2. In another embodiment, as shown in FIG. 3, the light source 120 may include a plurality of point light sources 121 arranged in a line, and the point light sources 121 are arranged along the second direction D2, for example.

In the present embodiment, when the collimation of the light beam 122 emitted by the light source 120 is high, the angle of divergence a is less, and when the light beam 122 is totally reflected multiple times by the first surface 210 and the second surface 220 of the light guide cover plate 200 and travels in the light guide cover plate 200, a high signal-to-noise ratio (SNR) with distinct bright regions and dark regions may be achieved. In addition, since the light beam 122 is more concentrated, the light beam 122 may be transmitted farther inside the light guide cover plate 200, but when transmitted in the light guide cover plate 200, the travel of the light beam 122 is readily blocked due to the destruction of the total reflection conditions (such as defects of the light guide cover plate).

When the collimation of the light beam 122 emitted by the light source 120 is low, the angle of divergence a is greater and the travel distance of the light beam 122 in the light guide cover plate 200 is shorter, and when the light beam 122 travels in the light guide cover plate 200, light beams 122 undergoing different numbers of total reflection may be irradiated on the same region, causing a reduction in signal-to-noise ratio. However, when the light beam 122 is continuously totally reflected by the first surface 210 and the second surface 220 and travels in the light guide cover plate 200, the travel of the light beam 122 is less readily blocked by the destruction of total reflection due to the defects of the light guide cover plate. Therefore, in the present embodiment, the angle of divergence a may fall within the range of 0.3° to 5° to achieve a good signal-to-noise ratio, and the travel of the light beam 122 is not readily blocked by the defects of the light guide cover plate.

In addition, when the fingerprint ridge 62 is in contact with the first surface 210 and destroys the total reflection of the light beam 122 at the first surface 210, the fingerprint ridge 62 causes the light beam 122 to be scattered. If the light beam 122 scattered by the fingerprint ridge 62 enters the image sensor 130, phenomena such as reduced signal-to-noise ratio of the image sensor 130, insufficient image quality, and the dark lines corresponding to the fingerprint ridge 62 not being dark enough readily occur. In order to suppress the light beam 122 scattered by the fingerprint ridge 62 from entering the image sensor 130, the distance between the position where the finger presses the first surface 210 and the light output element 140 may be suitably designed so that the light beam 122 reflected by the region of the first surface 210 below the fingerprint groove 64 may be further totally reflected by the second surface 220 and the first surface 210 multiple times before entering the image sensor 130. In this way, the light beam 122 scattered by the fingerprint ridge 62 may be effectively suppressed from entering the image sensor 130, thereby improving signal-to-noise ratio. In an embodiment, the light beam 122 reflected by the region of the first surface 210 below the fingerprint ridge 64 is further totally reflected by any of the first surface 210 and the second surface 220 0 to 4 times before entering the image sensor 130.

Moreover, the distance between the position where the finger presses the first surface 210 and the light incident portion 300 may also be suitably designed so that the light beam 122 entering the flat plate portion 200 from the light incident portion 300 spreads on a plane perpendicular to the second direction D2 by a sufficient width via a sufficient number of total reflections of any of the first surface 210 and the second surface 220. That is, the light beam 122 travels a long enough distance in the flat plate portion 200 so as sufficiently cover the range of the finger when irradiated to the position where the finger is pressed.

It is worth noting that when the light beam 122 enters the flat plate portion 200 via the light incident portion 300 and is irradiated on the first surface 210, the incident angle at the first surface 210 needs to be greater than the critical angle to ensure the first surface 210 may totally reflect the light beam 122. In an embodiment, the angle of inclination of the inclined light incident surface 310 with respect to the first surface 210 is, for example, 45 degrees, but the invention is not limited thereto. In addition, in the present embodiment, the first surface 210 is parallel to the second surface 220, for example.

Figure 4:
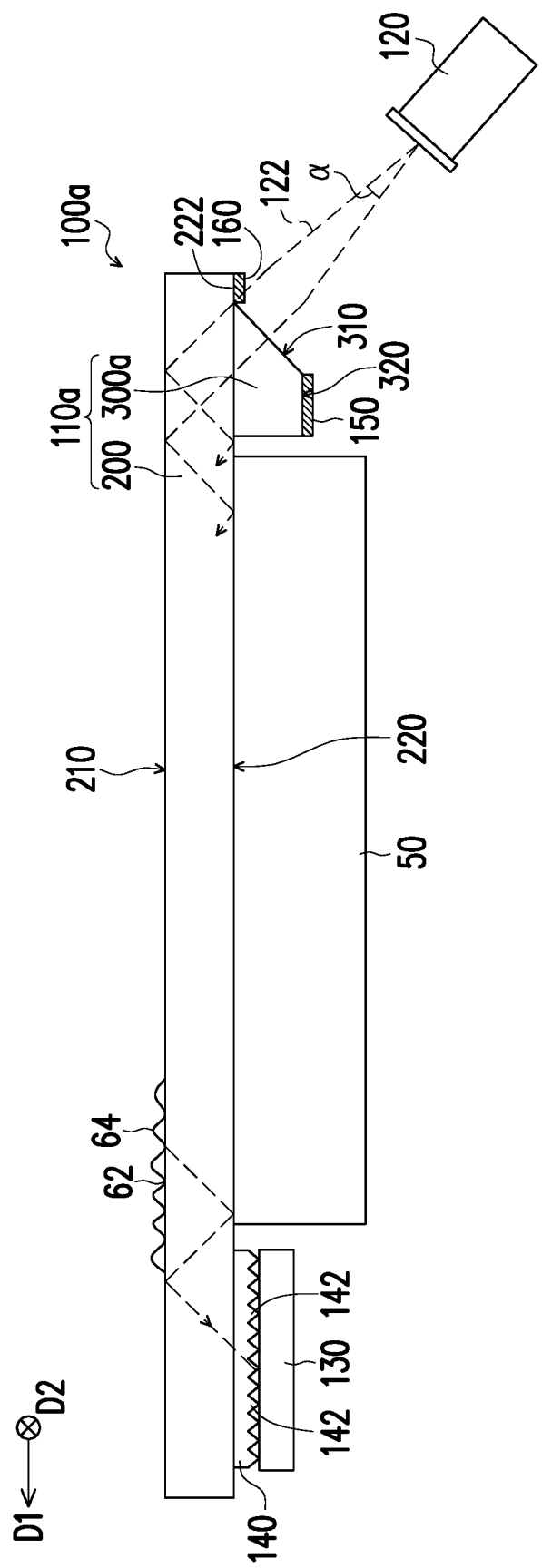
FIG. 4 is a cross-sectional view of a fingerprint sensing device disposed on a display according to another embodiment of the invention.

FIG. 4 is a cross-sectional view of a fingerprint sensing device disposed on a display according to another embodiment of the invention. Referring to FIG. 4, a fingerprint sensing device 100*a* of the present embodiment is similar to the fingerprint sensing device 100 of FIG. 1, and the difference between the two is as follows. In the fingerprint sensing device 100*a* of the present embodiment, a light incident portion 300*a* of a light guide cover plate 110*a* further has a flat top surface 320 facing away from the second surface 220 and connected to the inclined light incident surface 310. Compared with the light incident portion 300 of FIG. 1 having a sharp vertex, the design of the flat top surface 320 may effectively prevent the light incident portion 300*a* from scratching other elements. In an embodiment, the flat top surface 320 is parallel to the second surface 220, for example.

In the present embodiment, the fingerprint sensing device 100*a* further includes a first light blocking film 150 and a second light blocking film 160, the first light blocking film 150 is disposed on the flat top surface 320, and the second light blocking film 160 is disposed at a region 222 of the second surface 220 connected to the inclined light incident surface 310, wherein the inclined light incident surface 310 is located between the first light blocking film 150 and the second light blocking film 160. In the present embodiment, the first light blocking film 150 and the second light blocking film 160 are light absorption films that may absorb the light beam 122. However, in other embodiments, the first light blocking film 150 and the second light blocking film 160 may also be reflective films, that is, films that may reflect the light beam 122.

In addition, in the present embodiment, the cross section of the light beam 122 emitted from the light source 120 may be circular, and a portion of the light beam 122 is blocked by the first light blocking film 150 and the second light blocking film 160 to form a linear light source.

Figure 5:
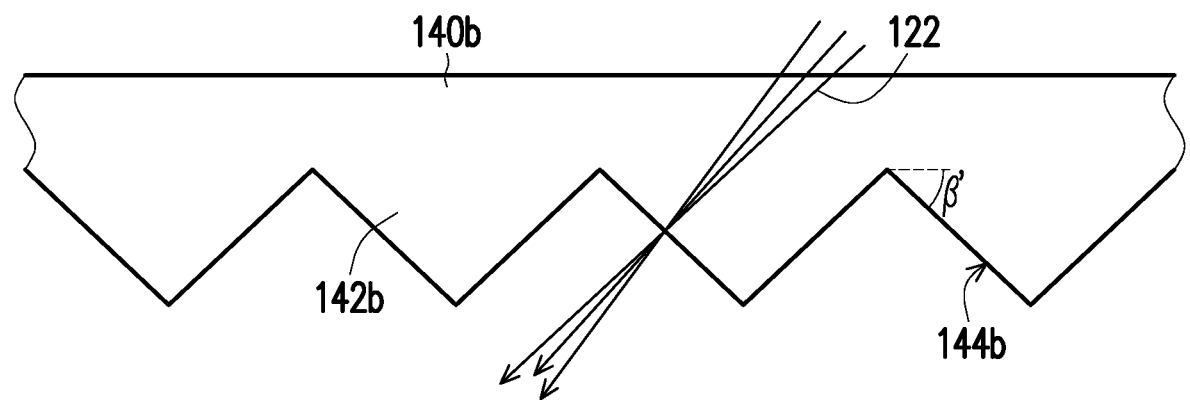
FIG. 5 is a cross-sectional view of a light output element according to still another embodiment of the invention.

FIG. 5 is a cross-sectional view of a light output element according to still another embodiment of the invention. Referring to FIG. 1 and FIG. 5, a light output element 140*b* of the present embodiment is similar to the light output element 140 of FIG. 2, and the difference between the two is that an angle of inclination β' of an inclined side surface 144*b* of micro prisms 142*b* of the light output element 140*b* with respect to the first surface 210 of the present embodiment is less than the angle of inclination β of the inclined side surface 144 of the micro prisms 142 of the light output element 140 with respect to the first surface 210 of FIG. 2. In this way, the light beam 122 irradiated at the inclined side surface 144*b* is transmitted obliquely to the image sensor 130. At this time, the image sensor 130 capable of receiving oblique light may be adopted to sense the light beam 122 from the inclined side surface 144*b*.

Moreover, in the embodiment of FIG. 2, the light beam 122 irradiated at the inclined side surface 144 is refracted downward by the inclined side surface 144. At this time, the image sensor 130 capable of receiving forward light may be adopted to sense the light beam 122 from the inclined side surface 144.

In addition, in the embodiment of FIG. 5, the angle of inclination β' may also satisfy (45°−α)≤β'<90°.

Figure 6:
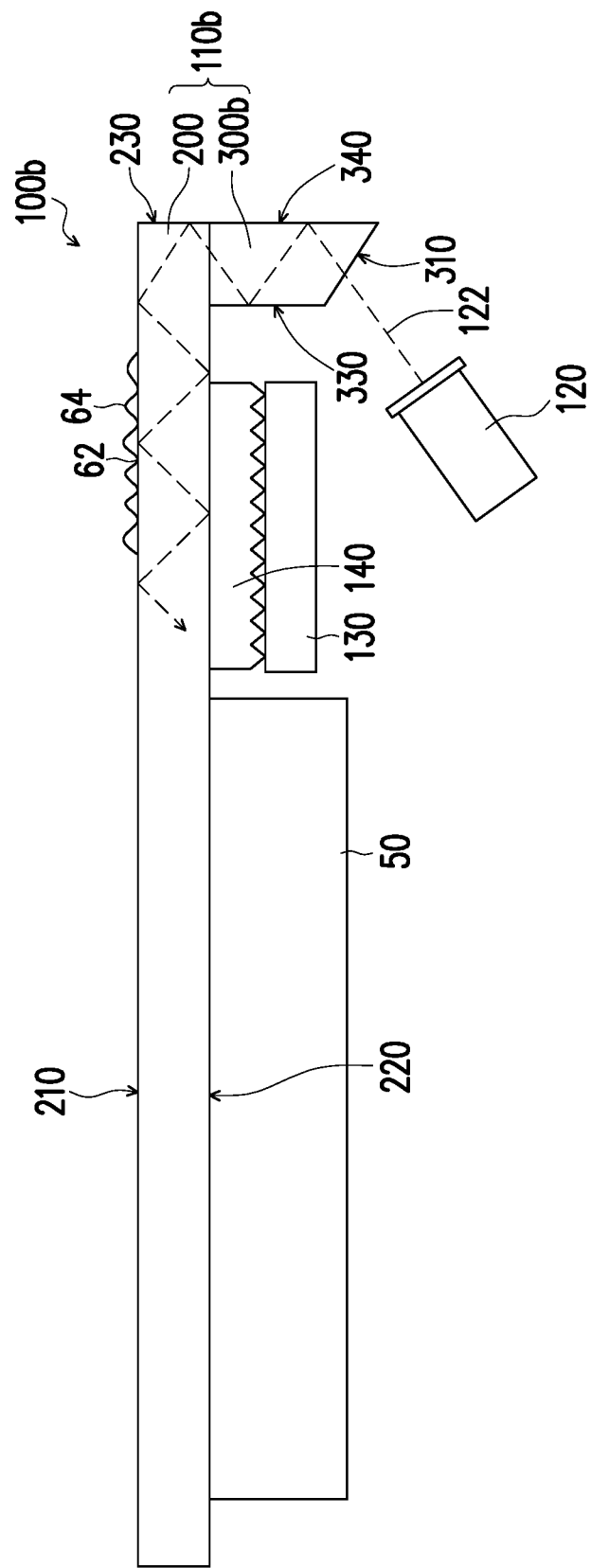
FIG. 6 is a cross-sectional view of a fingerprint sensing device disposed on a display according to another embodiment of the invention.

FIG. 6 is a cross-sectional view of a fingerprint sensing device disposed on a display according to another embodiment of the invention. Referring to FIG. 6, a fingerprint sensing device 100*b* of the present embodiment is similar to the fingerprint sensing device 100 of FIG. 1, and the difference between the two is as follows. In the fingerprint sensing device 100*b* of the present embodiment, the inclined light incident surface 310 of a light incident portion 300*b* of the light guide cover plate 110*b* faces the inside of the light guide cover plate 110*b*, and in the fingerprint sensing device 100 of FIG. 1, the inclined light incident surface 310 of the light incident portion 300 of the light guide cover plate 110 faces the outside of the light guide cover plate 110. In addition, in the fingerprint sensing device 100*b* of the present embodiment, the light incident portion 300*b* and the light output element 140 are disposed at the same end of the second surface 220. In the present embodiment, the light beam 122 entering the light entering portion 300*b* from the inclined light incident surface 310 is totally reflected by two opposite side surfaces 340 and 330 of the light entering portion 300*b*, and then enters the flat plate portion 200, and after total reflection by a side surface 230 of the flat plate portion 200, the light beam 122 is totally reflected by the first surface 210 and the second surface 220 of the flat plate portion 200 and transmitted to the finger.

Figure 7:
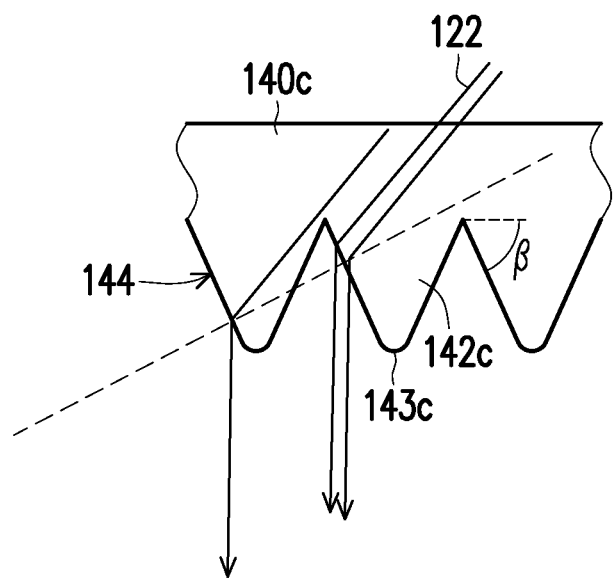
FIG. 7 and FIG. 8 are cross-sectional views of light output elements according to another two embodiments of the invention.
Figure 8:
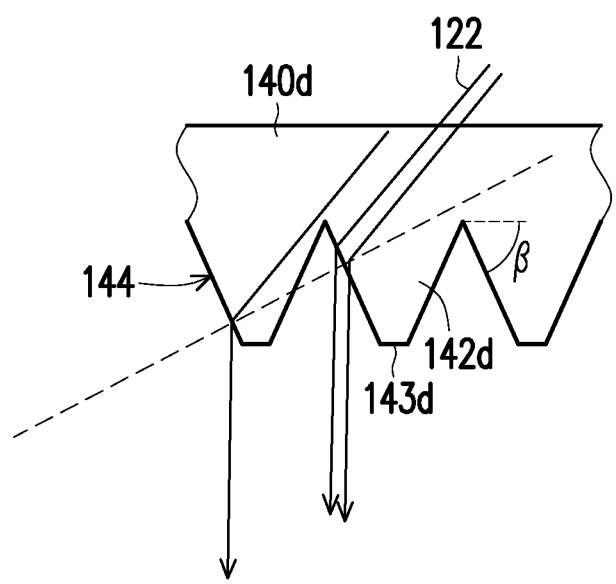

FIG. 7 and FIG. 8 are cross-sectional views of light output elements according to another two embodiments of the invention. Please refer to FIG. 2, FIG. 7, and FIG. 8, light output elements 140*c* and 140*d* of the two embodiments are similar to the light output element 140 of FIG. 2, and the difference between the two is that the vertex 143 of the micro prisms 142 of the light output element 140 of FIG. 2 is a sharp angle, a vertex 143*c* of micro prisms 142*c* of the light output element 140*c* of FIG. 7 is a rounded angle, and a vertex 143*d* of micro prisms 142*d* of the light output element 140*d* of FIG. 8 is a flat top chamfer.

Based on the above, in the fingerprint sensing device of an embodiment of the invention, the inclined light incident surface is adopted to guide the oblique light beam to the light guide cover plate, such that the light beam is totally reflected in the light guide cover plate multiple times. When the finger is pressed against the light guide cover plate, the fingerprint ridge destroys the total reflection phenomenon of the light beam at the first surface, so that the image generated by the light beam guided to the image sensor by total reflection generates corresponding dark lines, thus forming the fingerprint image. In this way, no matter what type of display panel (including a transparent display panel or an opaque display panel) is disposed below the light guide cover plate, fingerprint sensing effect may be effectively achieved.

Therefore, the fingerprint sensing device of an embodiment of the invention may be widely applied to on-screen fingerprint recognition solutions adopting various types of screens.

What is claimed is:

1. A fingerprint sensing device, comprising:
a light guide cover plate, comprising:
   a flat plate portion having a first surface and a second surface opposite to each other; and
   a light incident portion located at the second surface and having an inclined light incident surface, wherein the inclined light incident surface is inclined with respect to the first surface and the second surface;
a light source configured to emit a light beam, wherein the light beam is sequentially transmitted to the light incident portion and the flat plate portion via the inclined light incident surface;
an image sensor; and
a light output element disposed on the second surface, contacting the second surface and guiding the light beam in the flat plate portion to the image sensor, wherein the light beam entering the flat plate portion from the light incident portion is totally reflected at the first surface and the second surface, the first surface is suitable for pressing by a finger of a user, and a fingerprint ridge of the finger is in contact with the first surface and destroys a total reflection phenomenon of the light beam at the first surface,
wherein the light output element is a prism sheet, the prism sheet has a plurality of micro prisms, and a vertex of the micro prisms faces a direction away from the first surface and the second surface, the light output element satisfies: $(45°-\alpha) \leq \beta < 90°$, wherein $\alpha$ is an angle of divergence when the light source emits the light beam, and $\beta$ is an angle of inclination of an inclined side surface of the micro prisms with respect to the first surface.

2. The fingerprint sensing device of claim 1, wherein the micro prisms are columnar prisms.

3. The fingerprint sensing device of claim 1, wherein the micro prisms are cone-shaped prisms.

4. The fingerprint sensing device of claim 1, wherein the vertex of the micro prisms is a sharp corner, a rounded corner, or a flat top chamfer.

5. The fingerprint sensing device of claim 1, wherein a pitch of the micro prisms falls within a range of 10 nm to 1 μm, and a height of the micro prisms falls within a range of 1 nm to 1 μm.

6. The fingerprint sensing device of claim 1, wherein the inclined light incident surface faces an inner side of the light guide cover plate.

7. The fingerprint sensing device of claim 1, wherein the inclined light incident surface faces an outer side of the light guide cover plate.

8. The fingerprint sensing device of claim 1, wherein the light incident portion further has a flat top surface facing away from the second surface and connected to the inclined light incident surface.

9. The fingerprint sensing device of claim 6, further comprising:
a first light blocking film disposed on the flat top surface; and
a second light blocking film disposed at a region of the second surface connected to the inclined light incident surface, wherein the inclined light incident surface is located between the first light blocking film and the second light blocking film.

10. The fingerprint sensing device of claim 7, wherein the first light blocking film and the second light blocking film are light absorbing films.

11. The fingerprint sensing device of claim 7, wherein the first light blocking film and the second light blocking film are reflective films.

12. The fingerprint sensing device of claim 7, wherein a cross section of the light beam emitted from the light source is circular, and a portion of the light beam is blocked by the first light blocking film and the second light blocking film to form a linear light source.

13. The fingerprint sensing device of claim 1, wherein a cross section of the light beam emitted by the light source is a linear cross section.

14. The fingerprint sensing device of claim 1, wherein the light source comprises a plurality of point light sources arranged in a line.

15. The fingerprint sensing device of claim 1, wherein the light incident portion and the light output element are respectively disposed at two opposite ends of the second surface.

16. The fingerprint sensing device of claim 1, wherein the light incident portion and the light output element are disposed at a same end of the second surface.

* * * * *